United States Patent
Vaidya et al.

(10) Patent No.: US 8,910,172 B2
(45) Date of Patent: Dec. 9, 2014

(54) APPLICATION RESOURCE SWITCHOVER SYSTEMS AND METHODS

(75) Inventors: Sachin M. Vaidya, Sunnyvale, CA (US); Bharat Dighe, Sunnyvale, CA (US); Venkeepuram R. Satish, Fremont, CA (US)

(73) Assignee: Symantec Corporation, Mountain View, CA (US)

(*) Notice: Subject to any disclaimer, the term of this patent is extended or adjusted under 35 U.S.C. 154(b) by 364 days.

(21) Appl. No.: 12/981,313

(22) Filed: Dec. 29, 2010

(65) Prior Publication Data

US 2012/0174112 A1    Jul. 5, 2012

(51) Int. Cl.
- *G06F 9/46* (2006.01)
- *G06F 11/00* (2006.01)
- *G06F 11/16* (2006.01)
- *G06F 15/177* (2006.01)
- *G06F 15/173* (2006.01)
- *G06F 9/48* (2006.01)

(52) U.S. Cl.
CPC ................... *G06F 9/4856* (2013.01)
USPC .......... 718/102; 718/100; 718/106; 714/4.11; 714/13; 714/1; 714/2; 709/226; 709/220; 709/221; 709/222; 709/223

(58) Field of Classification Search
None
See application file for complete search history.

(56) References Cited

U.S. PATENT DOCUMENTS

| 7,228,453 B2* | 6/2007 | O'Brien et al. ............... 714/13 |
| 7,426,652 B2* | 9/2008 | Liccione et al. ............... 714/3 |
| 7,689,862 B1* | 3/2010 | Bharthulwar et al. .......... 714/13 |
| 7,757,116 B2* | 7/2010 | Brown et al. .................. 714/13 |
| 2011/0088034 A1* | 4/2011 | Vernier ....................... 718/100 |

* cited by examiner

*Primary Examiner* — Meng An
*Assistant Examiner* — Bing Zhao
(74) *Attorney, Agent, or Firm* — Wilmer Cutler Pickering Hale and Dorr LLP

(57) ABSTRACT

Registry information systems and methods are presented. In one embodiment, an application resource switchover method comprises receiving a switchover indication wherein the switchover indication includes an indication to switchover execution of at least one service of an application running on a primary system resource to running on a secondary system resource; performing a switchover preparation process, wherein the switchover preparation process includes automatically generating a switchover plan including indications of switchover operations for performance of a switchover process; and performing the switchover process in which the at least one of the application services is brought up on the secondary system resource in accordance with the plan of switchover operations. In one embodiment, automatically generating a plan of switchover operations includes analyzing the switchover indication, wherein the analyzing includes determining a type of switchover corresponding to the switchover indication. There can be a variety of switchover types.

18 Claims, 14 Drawing Sheets

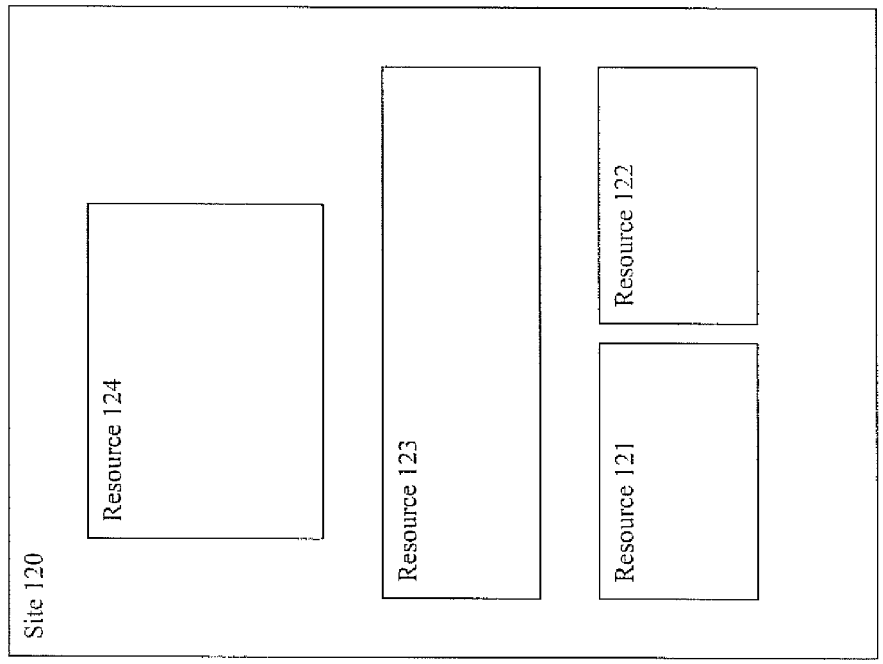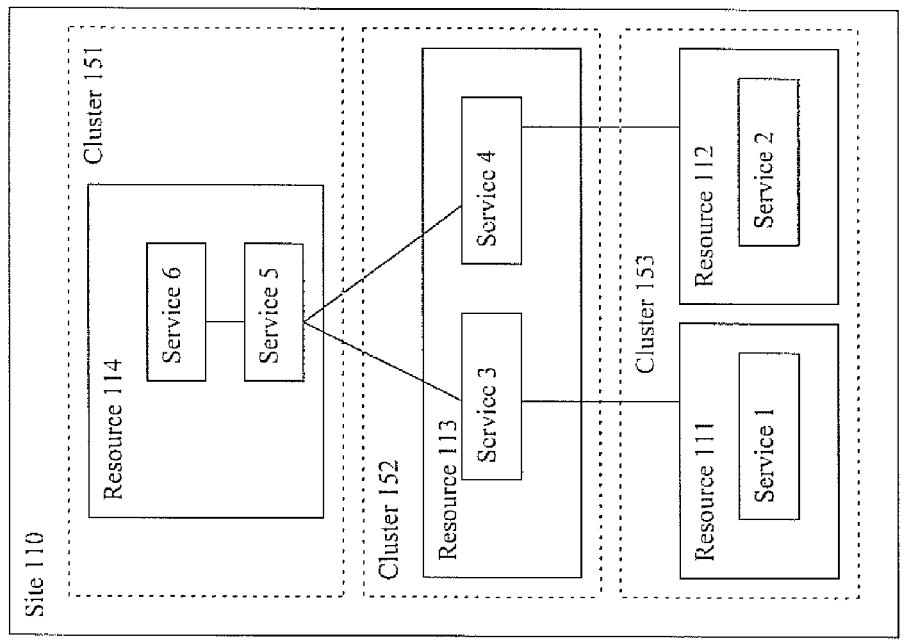
FIG 1

300

---

310
Establishing a hierarchy for the application.

---

320
Establishing an alternate system for running an application.

---

330
Performing an application resource switchover method.

410
Receiving a switchover indication.

420
Performing a switchover preparation process.

430
Performing a switchover process.

---
510
Determining the status of an application service.

---
520
Determining dependencies associated with an application services.

---
530
Establishing the indications of switchover operations to implement a switchover.

> 610
> Brining down an application service on a first system resource.

> 620
> Retrieving authority associated with running the application services.

> 630
> Bringing up the application up on the secondary system resource.

1110
Creating a hierarchical order of application dependencies.

---

1120
Developing a sequence or order for start up operations associated with a switchover plan in accordance with the hierarchical order of application dependencies.

---

1130
Developing a sequence or order for shut down operations associated with a switchover plan in accordance with the hierarchical order of application dependencies.

FIG 11

APPLICATION RESOURCE SWITCHOVER SYSTEMS AND METHODS

FIELD OF THE INVENTION

The present embodiments relate to the field of application resource switchover systems and methods.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of important and confidential information and significant resources are expended storing and processing the information. Various applications can be utilized to facilitate the processing and storage of the information and are often susceptible to interruptions.

Interruptions to application execution can have undesirable consequences, especially interruptions in critical applications (e.g., security applications, health care applications, financial applications, etc.). There can be a variety of detrimental impacts associated with interruptions including work stoppage, inconvenience, loss of opportunities, etc. Traditional attempts at addressing application interruptions and reconfigurations are usually resource intensive and often susceptible to errors and glitches. In case of an outage or during maintenance, users typically have to manually migrate or recover each service in a specific order. Conventional attempts can become even more problematic when an application is complex. Applications usually have a variety of services and interactions or dependencies between the services and these characteristics can be very complex. In addition, the architectures and hierarchies utilized in implementing applications services can be complicated and have a variety of configurations.

SUMMARY

Registry information systems and methods are presented. In one embodiment, an application resource switchover method comprises receiving a switchover indication wherein the switchover indication includes an indication to switchover execution of at least one service of an application running on a primary system resource to running on a secondary system resource; performing a switchover preparation process, wherein the switchover preparation process includes automatically generating a switchover plan including indications of switchover operations for performance of a switchover process; and performing the switchover process in which the at lease one of the application services is brought up on the secondary system resource in accordance with the switchover plan. In one embodiment, automatically generating a plan of switchover operations includes analyzing the switchover indication, wherein the analyzing includes determining a type of switchover corresponding to the switchover indication. There can be a variety of switchover types (e.g., a migration switchover, a recovery switchover, etc.).

In one embodiment, the automatically generating a plan of switchover operations includes: determining the status of the at least one of the application services; determining dependencies associated with the at least one of the application services; and establishing the indications of switchover operations to implement a switchover in accordance with information on the status of the at least one of the application services and dependencies of the at least one of the application services. The performing the switchover process includes: bringing down the at least one application service on a first system resource; retrieving authority associated with running the at least one of the application services; assigning the authority to the secondary site resource; and bringing up the at least one application service on the secondary system resource. The switchover process application can be a multi-tier application and the at least one service is managed by a first disaster recovery aware high availability solution, wherein the first disaster recovery aware high availability solution is different from a second disaster recovery aware high availability solution that manages a different service associated with the application.

In one embodiment, a reprogrammable tangible computer readable storage medium has stored thereon, computer executable instructions that, when executed by a computer system cause the computer system to perform a method comprising: receiving a switchover indication wherein the switchover indication includes an indication to switchover execution of at least one service of an application running on a primary system resource to running on a secondary system resource; performing a switchover preparation process, wherein the switchover preparation process includes automatically generating a switchover plan including indications of switchover operations for performance of a switchover process; and performing the switchover process in which the at lease one of the application services is brought up on the secondary system resource in accordance with the switchover plan. In one embodiment, automatically generating a plan of switchover operations includes analyzing the switchover indication, wherein the analyzing includes determining a type of switchover corresponding to the switchover indication. There can be a variety of switchover types (e.g., a migration switchover, a recovery switchover, etc.).

In one embodiment, the automatically generating a plan of switchover operations includes: determining the status of the at least one of the application services; determining dependencies associated with the at least one of the application services; and establishing the indications of switchover operations to implement a switchover in accordance with information on the status of the at least one of the application services and dependencies of the at least one of the application services. The performing the switchover process includes: bringing down the at least one application service on a first system resource; retrieving authority associated with running the at least one of the application services; assigning the authority to the secondary site resource; and bringing up the at least one application service on the secondary system resource. The switchover process application can be a multi-tier application and the at least one service is managed by a first disaster recovery aware high availability solution, wherein the first disaster recovery aware high availability solution is different from a second disaster recovery aware high availability solution that manages a different service associated with the application.

In one embodiment, a computer system comprises a processor coupled to a computer readable storage media and executing computer readable code which causes the computer system to perform operations including: receiving a switchover indication wherein the switchover indication includes an indication to switchover execution of at least one service of an application running on a primary system resource to running on a secondary system resource; performing a switchover preparation process, wherein the switchover preparation process includes automatically generating a switchover plan including indications of switchover operations for performance of a switchover process; and performing the switchover process in which the at lease one of the application services is brought up on the secondary system resource in accordance with the switchover plan. In one embodiment, automatically generating a plan of switchover operations includes analyzing the switchover indication, wherein the analyzing includes determining a type of switchover corresponding to the switchover indication. There can be a variety of switchover types (e.g., a migration switchover, a recovery switchover, etc.).

In one embodiment, the automatically generating a plan of switchover operations includes: determining the status of the at least one of the application services; determining dependencies associated with the at least one of the application services; and establishing the indications of switchover operations to implement a switchover in accordance with information on the status of the at least one of the application services and dependencies of the at least one of the application services. The performing the switchover process includes: bringing down the at least one application service on a first system resource; retrieving authority associated with running the at least one of the application services; assigning the authority to the secondary site resource; and bringing up the at least one application service on the secondary system resource. The switchover process application can be a multi-tier application and the at least one service is managed by a first disaster recovery aware high availability solution, wherein the first disaster recovery aware high availability solution is different from a second disaster recovery aware high availability solution that manages a different service associated with the application.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 1 is a block diagram of an exemplary application resource switchover system or architecture before a switchover in accordance with one embodiment of the present invention.

FIG. 3 is a block diagram of an exemplary application method in accordance with one embodiment of the present invention.

FIG. 4 is block diagram of an exemplary application resource switchover method in accordance with one embodiment of the present invention.

FIG. 5 is a block diagram of an exemplary automatic switchover plan generation process in accordance with one embodiment of the present invention.

FIG. 6 is a block diagram of an exemplary switchover performance process in accordance with one embodiment of the present invention.

FIG. 11 is a block diagram of an exemplary dependency resolution process in accordance with one embodiment of the present invention.

DETAILED DESCRIPTION

Figure 2:
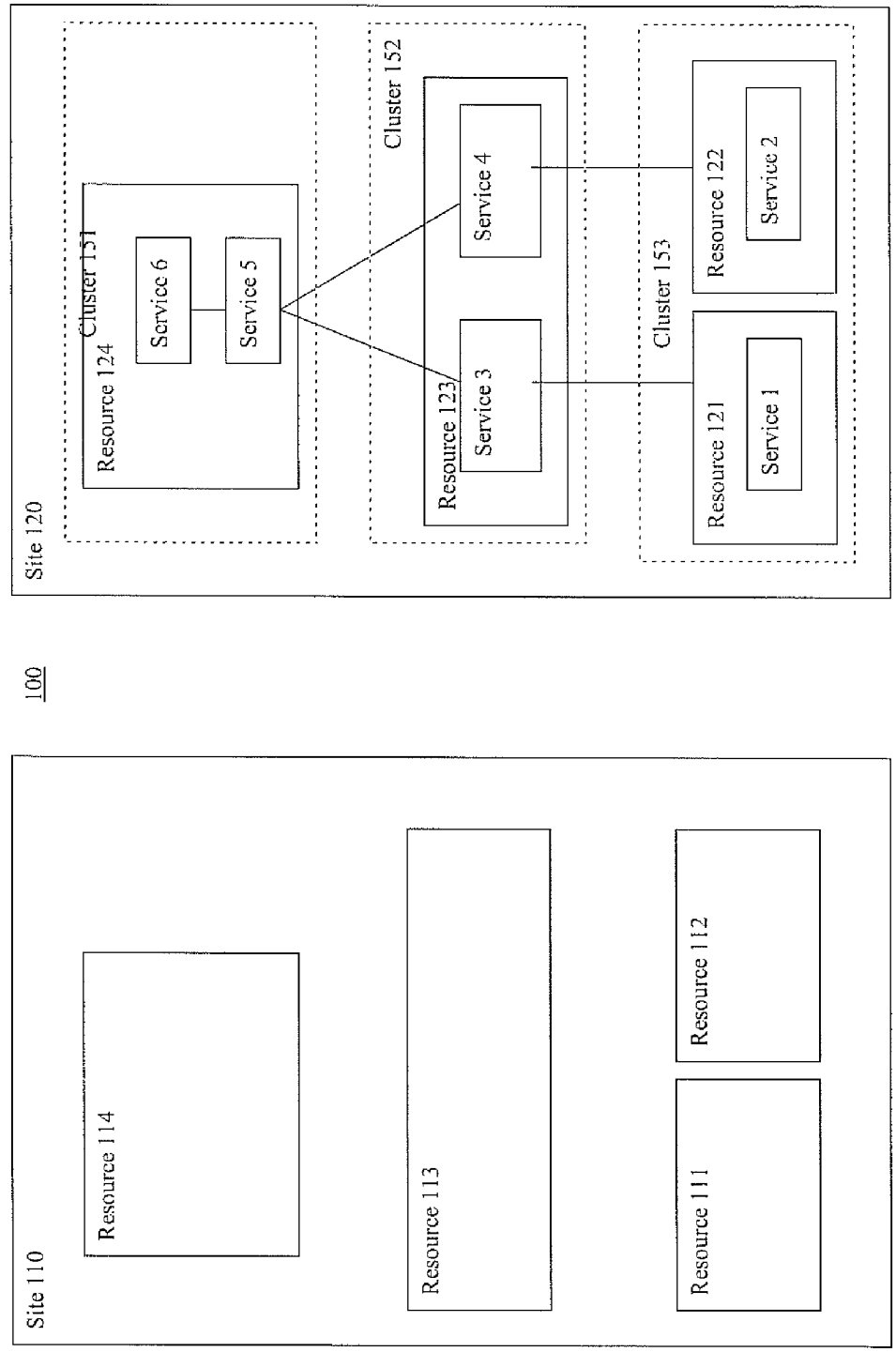
FIG. 2 is a block diagram of an exemplary application resource switchover system after a switchover in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

Systems and methods that facilitate efficient and effective application resource switchover are presented. In one embodiment, an application service up and running online on a first resource (e.g., a first computer, a first server, resources of a first site, resources of a first system, etc.) is stopped on the first resource and started up on a second resource (e.g., a second computer, a second server, resources of a second site, resources of a second system, etc.). The first resource can be in a first location and the second resource can be in a second location remote from the first location. In one embodiment, an application resource switchover method is performed in which a switchover plan is automatically developed for switching execution or running of a service on one resource to another resource. The systems and methods can be utilized in a variety of different architectures and environments. The application resource switchover systems and methods can include single step migration and recovery of multi-tier applications. In one embodiment, the systems and methods can be utilized in implementations in which applications include services belonging to or running on distinct clusters.

It is appreciated the switchover plan can be automatically developed in response to a variety of switchover initiation indications (e.g., a failover initiation indication, a recovery initiation indication, a migration initiation indication, etc.). The switchover plan can be directed for utilization in migrating entire applications, recovering faulted applications, recovering applications from faulted sites as a single operation, and so on. In one embodiment, application service resource switchover systems and methods can be implemented as a single step or single click switchover.

FIG. 1 is a block diagram of an exemplary application resource switchover system 100 before a switchover in accordance with one embodiment of the present invention. Resource switchover system or architecture 100 includes site 110 and site 120. Site 110 includes resources 111, 112, 113, and 114. Site 110 includes resources 121, 122, 123 and 124. Various services of an application can run or execute on the respective resources. For example, service 1 can run on resource 111, service 2 can run on resource 112, services 3 and 4 can run on resource 113 and service 5 and 6 can run on resource 114. In one embodiment of the present invention, an application resource switchover method is performed in which a switchover plan is automatically developed for switching execution or running of a service on one resource to another resource. The switchover plan can be automatically developed in response to a switchover initiation indication (e.g., a failover initiation indication, a recovery initiation indication, a migration initiation indication, etc.).

FIG. 2 is a block diagram of an exemplary application resource switchover system 100 after a switchover in accordance with one embodiment of the present invention. For example, service 1 can run on resource 121, service 2 can run on resource 122, services 3 and 4 can run on resource 123 and service 5 and 6 can run on resource 124.

FIG. 3 is a block diagram of an exemplary application method 300 in accordance with one embodiment of the present invention. In one embodiment, exemplary application method 300 is utilized for a disaster recovery (DR) enabled multi-tiered application comprising services managed by multiple high availability installations that might be installed on different platforms and can be provided by different vendors. In one exemplary implementation, each service within an application has a DR counterpart running on a secondary or remote site.

In block 310, a hierarchy for the application is established. In one embodiment, the hierarchy facilitates utilization of a multi-tier application comprised of services that can be managed by different disaster recovery (DR) aware highly available (HA) solutions. In one exemplary implementation, dependencies associated with the application are established. There can be a variety of dependencies (e.g., internal dependencies, external dependencies, user designated dependencies, etc.). The dependencies can be associated with a specific order or sequence of application service availability for the application to function correctly. Dependencies can be defined between individual DR capable services that may be a part of distinct clusters which can facilitate set up of a DR-ready multi-tier application. The application can be disaster recovery ready.

In block 320, an alternate system is established for running an application. The alternate system or secondary system can be part of a remote site. In one embodiment, the alternate system is configured to be capable of running an application if the application is not able to run or execute on another site. In one exemplary implementation, the alternate system has access to replicated or backup application information.

In block 330, an application resource switchover method is performed. In one embodiment, an application resource switchover method includes automated intelligent application service activation on resources of an alternate system (e.g., secondary system, remote system, etc.). In one exemplary implementation, application services are automatically shut down and brought offline on resources of a first system and started up and brought online on resources of a second system. The application resource switchover method operations can include automatic generation of a switchover plan and the switchover plan can be intelligently developed to maintain service dependency relationships. Additional description of application resource switchover methods are presented in following sections of the detailed description.

FIG. 4 is block diagram of exemplary application resource switchover method 400 in accordance with one embodiment of the present invention. In one embodiment, application resource switchover method 400 extends migration and recovery capabilities beyond an individual service level to multi-tier applications where the services are spread across multiple clusters.

In block 410 a switchover indication is received. In one embodiment, the switchover indication includes an indication to switchover execution of a service application running on a primary system resource to running on a secondary system resource. The switchover indication can be associated with migration of services activities. A migration of services can include shutdown of services on one site and starting up of those services on a remote secondary site. A migration of services can be performed during maintenance of services or can be based on load or business processes. The switchover indication can be associated with recovery of services activities. In one embodiment, a recovery of services (e.g., in the case of a service fault or unplanned downtime, etc.) can include starting up a secondary counterpart of the service as soon as possible with minimal downtime.

In block 420, a switchover preparation process is performed. In one embodiment, the switchover preparation process includes automatically generating a switchover plan including indications of switchover operations for performance of a switchover process. In one exemplary implementation, generating a plan of switchover operations includes analyzing the switchover indication, wherein the analyzing includes determining a type of switchover corresponding to the switchover indication. The type of switchover can be a migration switchover, a recovery switchover, etc. In one embodiment an automatic switchover plan generation process is performed.

In block 430 the switchover process is performed. In one embodiment, an application service is brought up on the secondary system resource in accordance with the switchover plan. Additional description of switchover operations are presented in following sections of the detailed description.

In one embodiment, the application is a multi-tier application. In one exemplary implementation of a multi-tier application at least one service is managed by a first disaster recovery aware high availability solution. The first disaster recovery aware high availability solution is different from a second disaster recovery aware high availability solution that manages a different service associated with the application.

FIG. 5 is a block diagram of an exemplary automatic switchover plan generation process 500 in accordance with one embodiment of the present invention. In one embodiment, automatic switchover plan generation process 500 is utilized in block 420.

In block 510, the status of an application service is determined. In one embodiment, the status as to whether an application service is up and running online or if the application service is down and offline is determined.

In block 520, dependencies associated with an application service are determined. In one embodiment, a dependency resolution process is performed. In one exemplary implementation a hierarchical order of application dependencies is created. The hierarchical order or hierarchy of application dependencies can correspond to a consolidated tree of application dependencies. There can be a variety of application dependencies (e.g., dependencies defined within each cluster, dependencies defined by a user, service instances as abstracted by clustering technologies or management tools, etc.). Additional description of dependency resolution processes are set forth in other sections of the detailed description.

In block 530, indications of switchover operations for implementing a switchover are established in accordance with information received regarding a switchover indication (e.g., received in block 410, etc.) and the results of blocks 510 and 520. In one exemplary implementation, an analysis of the information and results is performed to determine a type switchover (e.g., a migration, a recovery etc.) and indications of operations for implementing the type of switchover are developed. In one embodiment, if the switchover type is a migration, the status of application services is analyzed to determine which applications are running and indication of an operation to bring down those applications is included in the switchover plan. In one embodiment, if the switchover type is a recovery, the status of application services is analyzed to determine which applications are not running and an indication of an operation to bring down other application services that are running is included in the switchover plan.

FIG. 6 is a block diagram of exemplary switchover performance process 600 in accordance with one embodiment of the present invention. In one embodiment, switchover performance process 600 is implemented in block 430.

In block 610, an application service on a first system resource is brought down. In one embodiment, an application service on a first system resource is stopped and brought off line. The application service on a first system resource is brought down in accordance with the switchover plan.

In block 620, authority associated with running the application services is retrieved. In one embodiment, the authority associated with running the application services is given to a secondary system resource.

In block 630, the application is brought up on the secondary system resource. In one embodiment, the application service on a second system resource is started and brought on line. The application service on the second system resource is brought up in accordance with the switchover plan.

Figure 7:
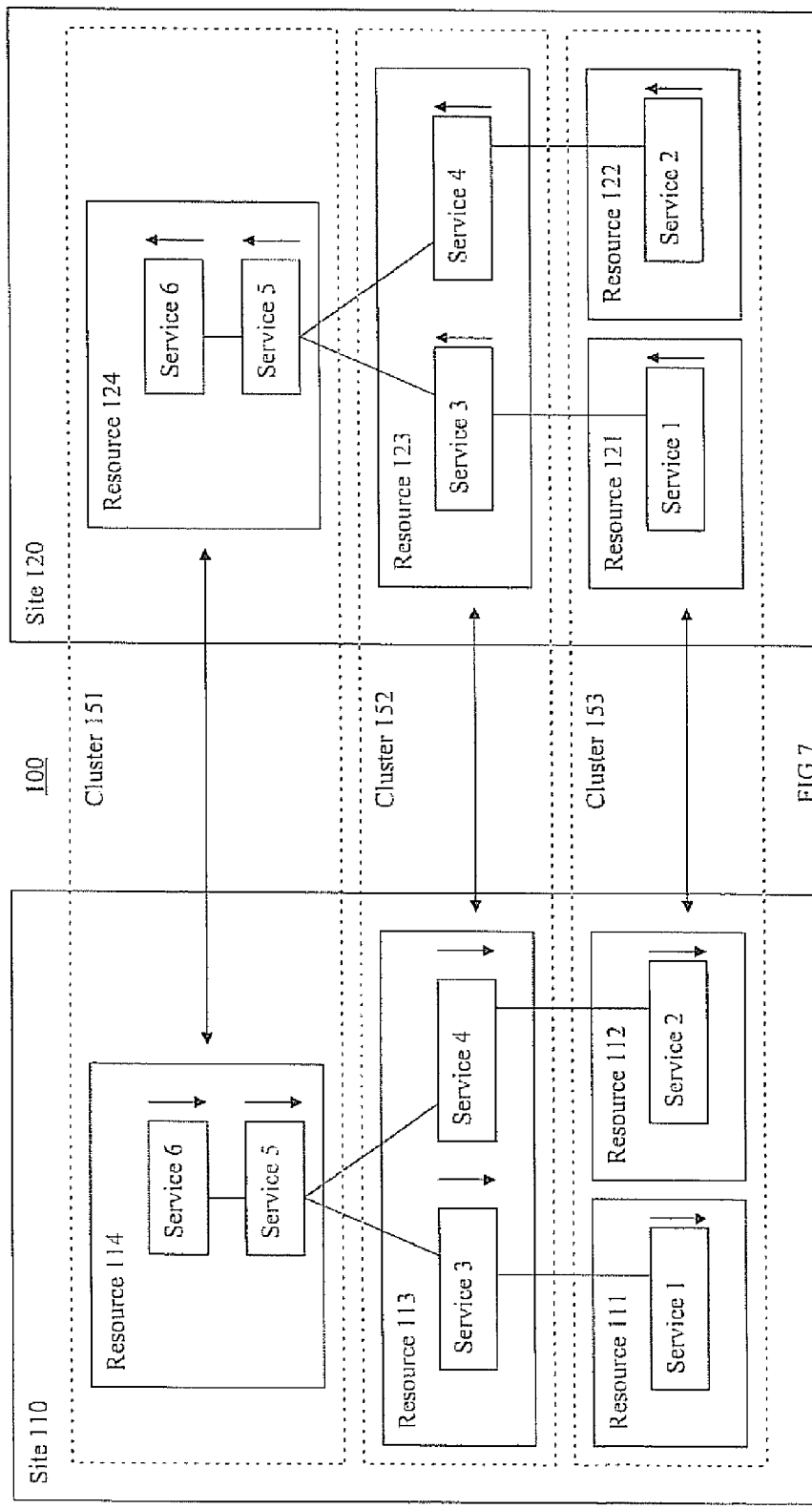
FIG. 7 is a block diagram illustrating exemplary migration operations on an application resource switchover system in accordance with one embodiment of the present invention.

FIG. 7 is a block diagram illustrating exemplary migration operations on application resource switchover system or architecture 100 in accordance with one embodiment of the present invention. It is appreciated that while the services are shown on both sites for purposes of illustration, in one embodiment the services are not running on both sites at the same time. The arrows on site 110 illustrate bringing down the application services in a top to bottom sequence. For example, services on site 110 are taken down or stopped in the following sequence or order: service 6, service 5, service3/service 4 and service 1 and service 2. The arrows on site 120 illustrate bringing up the application services in a bottom to top sequence. For example, services on site 120 are brought up or started in the following sequence or order: service 1/service 2, service3/service 4, service 5 and service 6.

It is appreciated that services can be brought down or stopped in parallel. For example, in FIG. 7 service3/service 4 are brought down or stopped in parallel. It is also appreciated that services can be brought up or started in parallel. For example, in FIG. 7 service 1/service 2 and service3/service 4 are brought up or started in parallel.

It is appreciated a migration approach can be utilized for a variety of scenarios. A migration scenario or case can be utilized to facilitate maintenance or planned outage. In one exemplary implementation, an administrator module or component implementing an application resource switchover method or process can migrate the services to a secondary site or DR site while the primary site is being serviced. In one embodiment, an application resource switchover system or method figures out the state of the services on the primary site, shuts down or "off-lines" the services on the primary site and then starts the services on the secondary or DR site. In one exemplary implementation, a user can be presented with a plan and after confirmation from the user the system performs the steps according to the plan. In an alternate exemplary implementation, the process can be performed by the administrator module without presenting the plan to the user and getting user approval. The plan can include the following operations: offline or bring down services on the primary site as per the order specified (e.g., in accordance with service dependences, user direction, etc.); and start the services on the secondary site in the order specified in the application configuration.

Figure 8:
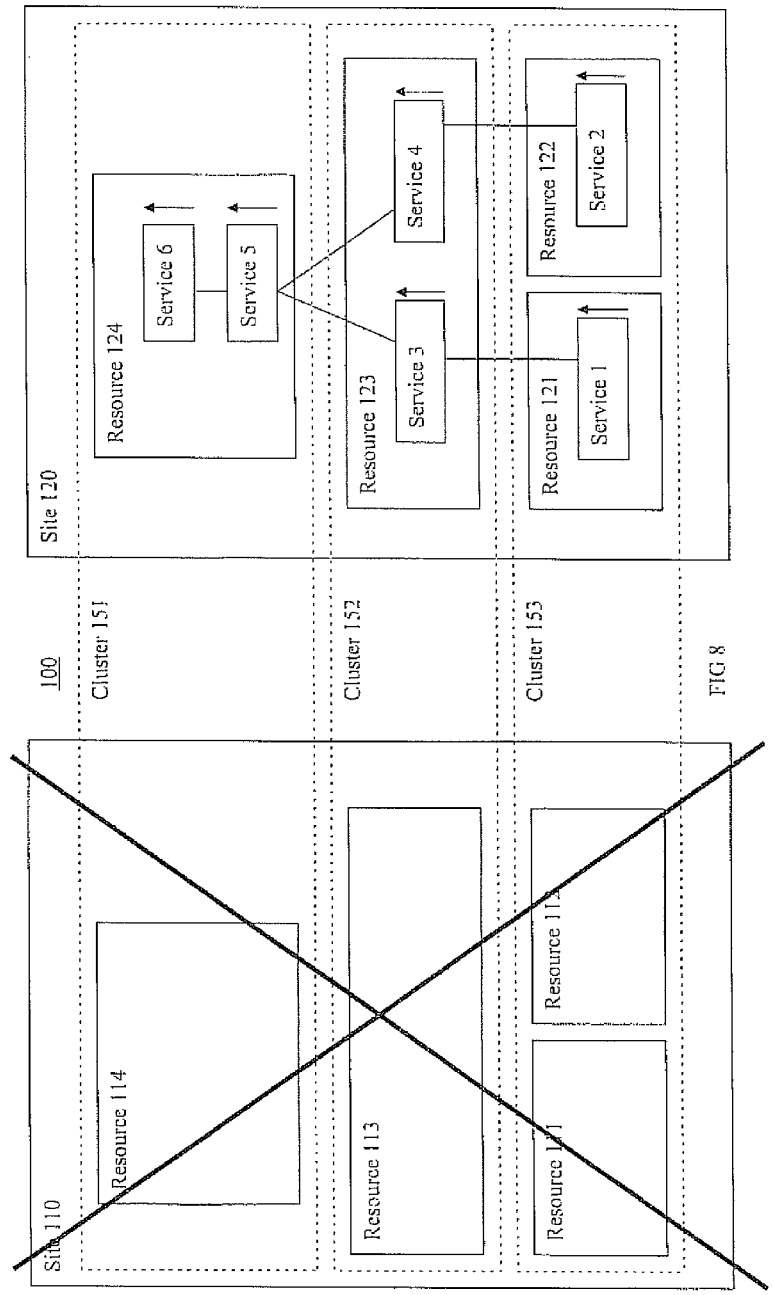
FIG. 8 is a block diagram illustrating exemplary recovery operations on an application resource switchover system or architecture in accordance with one embodiment of the present invention.

FIG. 8 is a block diagram illustrating exemplary recovery operations on application resource switchover system or architecture 100 in accordance with one embodiment of the present invention. In one embodiment, there is a site failure at a primary site in which services are running. The X on site 110 illustrates that the services on the site went down for some reason (e.g., a site failure, etc.). For example, service 6, service 5, service3/service 4 and service 1 and service 2 crash on site 110. The authority for the services is retrieved and the arrows on site 120 illustrate bringing up the application services in a bottom to top sequence. For example, services on site 120 are brought up or started in the following sequence or order: service 1/service 2, service3/service 4, service 5 and service 6.

It is appreciated a recovery approach can be utilized for a variety of scenarios. A recovery scenario or case can be utilized to facilitate recovery from a site failure. In one embodiment, the entire primary site 110 containing multi-tier apps faults, goes down or is unreachable. In one exemplary implementation, an administrator module or component (e.g., on remote site, etc.) is notified (e.g., by means of a SNMP or SMTP notification, etc.). In one exemplary implementation, an administrator module proceeds with an application resource switchover method or process (e.g., method 400, 500, 600, 700, etc.). In one embodiment a switchover plan is developed and the plan can include the following operations: marking the faulted site as a disaster (if needed), grabbing and giving or assigning authority for the services to resources on the secondary site, starting or bringing up the services on the secondary site (e.g., in the order specified in the application configuration, etc.). In one exemplary implementation, a user can be presented with a plan and after confirmation from the user the system performs the steps according to the plan. In an alternate exemplary implementation, the process can be performed by the administrator module without presenting the plan to the user and getting user approval.

Figure 9:
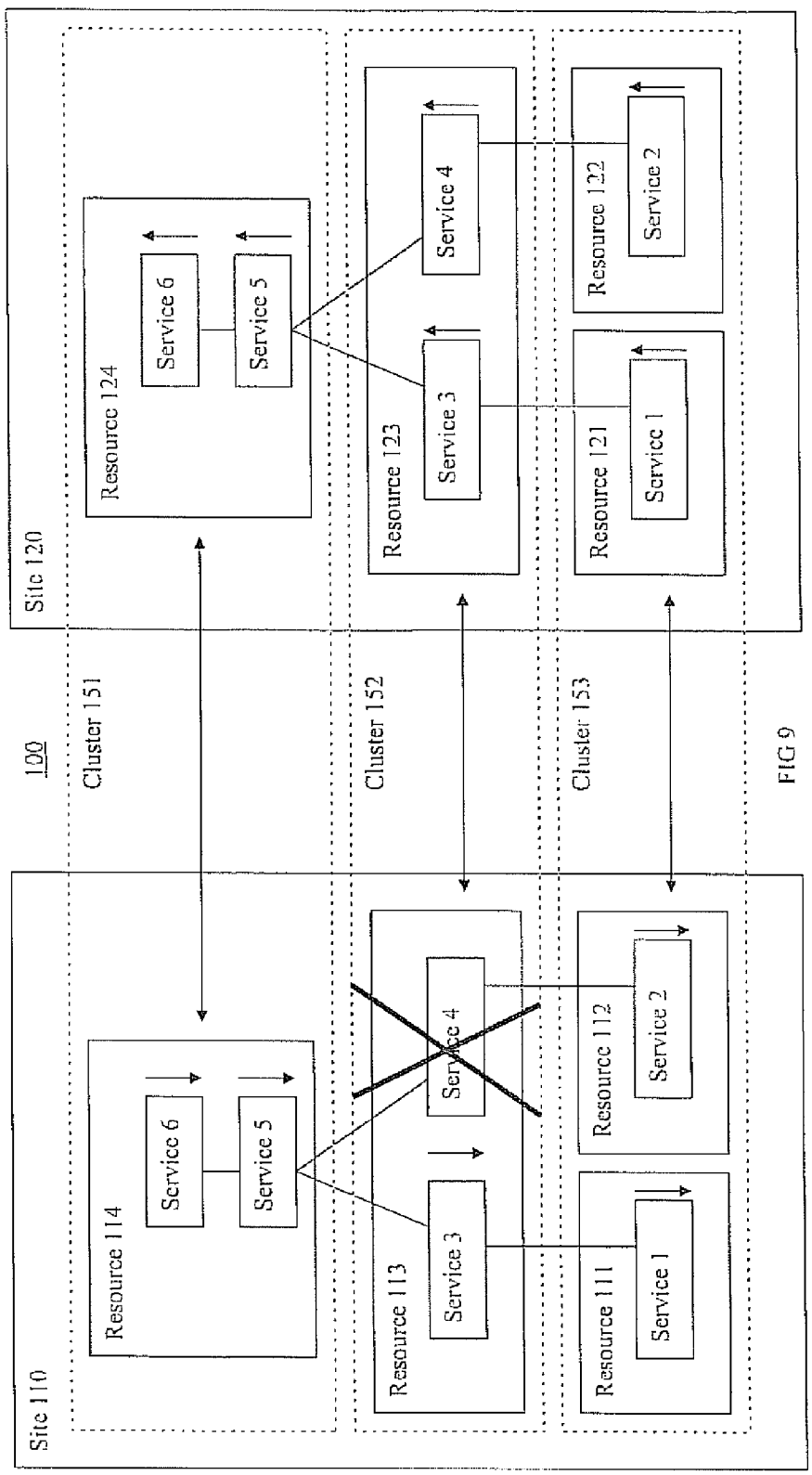
FIG. 9 is a block diagram illustrating exemplary recovery operations on an application resource switchover system or architecture in accordance with one embodiment of the present invention.

FIG. 9 is a block diagram illustrating exemplary recovery operations on application resource switchover system or architecture 100 in accordance with one embodiment of the present invention. In one embodiment, one or more services within a site fault. It is appreciated that while the services are shown on both sites for purposes of illustration, in one embodiment the services are not running on both sites at the same time. The X on service 4 of site 110 illustrates that the services on the site went down for some reason. The arrows on site 110 illustrate bringing down the application services in a top to bottom sequence. For example, services on site 110 are taken down or stopped in the following sequence or order: service 6, service 5, service3 and service 1 and service 2. The authority for the services is retrieved and the arrows on site 120 illustrate bringing up the application services in a bottom to top sequence. For example, services on site 120 are brought up or started in the following sequence or order: service 1/service 2, service3/service 4, service 5 and service 6.

It is appreciated a recovery approach can be utilized for a variety of scenarios. A recovery scenario or case can be utilized to facilitate recovery from one or more service failures. In one embodiment, service 4 running on site 110 faults. In one exemplary implementation, an administrator module or component implementing an application resource switchover method or process can recover the services to a secondary site or DR site to mitigate a fault on a service running on the primary site. In one embodiment, an application resource switchover system or method figures out the state of the services on the primary site (e.g., including determining if one or more services faulted, crashed, etc.), shuts down or "off-lines" the running services on the primary site and then starts the services on the secondary or DR site. In one exemplary implementation, a user can be presented with a plan and after confirmation from the user the system performs the steps according to the plan. In an alternate exemplary implementation, the process can be performed by the administrator module without presenting the plan to the user and getting user approval. The plan can include the following operations: offline or bring down services on the primary site as per the order specified (e.g., in accordance with service dependences, user direction, etc.); and start the services on the secondary site in the order specified in the application configuration.

In one embodiment a plan sequence or order for shutting down and starting up application services is based upon dependencies associated with the services. In one exemplary implementation, generating a plan includes utilizing a hierarchical order of application dependencies. The hierarchical order or hierarchy of application dependencies can correspond to a consolidated tree hierarchy of application dependencies (e.g., dependencies defined within each cluster, dependencies defined by a user, etc.). A hierarchy tree thus formed can have multiple leaf nodes and 1 or more roots. A consolidated tree of application dependencies can be visualized by exemplary consolidated tree of application dependencies 1000 shown in FIG. 10. Consolidated tree of application dependencies 1000 includes hierarchical graphs of nodes A through G (e.g., upon which application services can run, etc.) which are arranged with dotted lines representing user defined service dependencies and solid lines representing internal dependencies defined within the clusters. In one embodiment, there is connectivity to the endpoints which manage the services and privileges to start/stop individual services.

FIG. 11 is a block diagram of exemplary dependency resolution process 1000 in accordance with one embodiment of the present invention. In one embodiment, dependency resolution process 1000 is utilized to facilitate generation of an application service resource switchover plan. In one exemplary implementation, dependency resolution process 1000 is utilized in block 510.

In block 1110, creating a hierarchical order of application dependencies. In one embodiment, the hierarchical order or hierarchy of application dependencies corresponds to a consolidated tree of application dependencies. There can be a variety of application dependencies (e.g., dependencies defined within each cluster, dependencies defined by a user, service instances as abstracted by clustering technologies or management tools, etc.).

In block 1120, a sequence or order for start up operations associated with a switchover plan is developed in accordance with the hierarchical order of application dependencies. In one embodiment, services represented by the leaf nodes are started up and brought online first. The state of the services can be monitored. In one exemplary implementation, when the children of a node are started completely, the system initiates start up and bringing online the service represented by that node. The starting of a service can include running commands relevant to the technology that manages that service.

Figure 10:
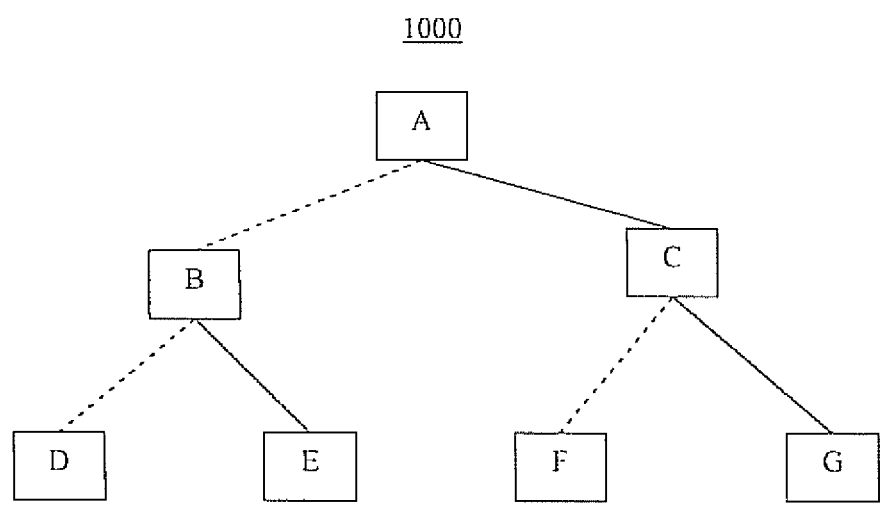
FIG. 10 is a block diagram of an exemplary consolidated tree of application dependencies 1000 in accordance with one embodiment of the present invention.

In one embodiment, block 1120 is implemented utilizing the hierarchical order of application dependencies represented by a consolidated tree of application dependencies shown in FIG. 10. During the start up operations, a system first initiates start up or bringing online services D, E, F and G. When the system detects that D and E are online or completely started, start up or bringing online of service B is initiated. Similarly C is started when F and G are started up or online. Start up or bringing online of service A is initiated when both B and C are detected as online. In one embodiment, a report indicating the application as started up and online can be sent after A is detected to be started up and online.

In block 1130, a sequence or order for shut down operations associated with a switchover plan is developed in accordance with the hierarchical order of application dependencies. In one embodiment, the shut down and off-lining of services is performed in the reverse order or sequence of block 1120. The state of the services can be monitored. In one exemplary implementation, when the parents of a node are shut down completely, the system initiates shut down and bringing offline the service represented by that node. Services represented by the leaf nodes are shut down and brought off-line last. The shutting down or off-lining of a service can include running commands relevant to the technology that manages that service. In one embodiment, a report indicating the application as shut down and off-line can be sent after the last leaf node is detected to be shut down or off-line.

It is appreciated that a variety of considerations or modifications can be made to the operations of dependency resolution process 1000. In one embodiment, start/stop operations can be rejected or halted if there is a cyclic dependency between application services. This can be achieved by means of a variety of algorithms (e.g., Hare and Tortoise algorithm, etc.). Start/stop operations can be rejected if an initial state of a service is detected or determined to be such that the service cannot start in that state. In one embodiment, when a service fails to start or stop successfully, the entire start/stop operation can be aborted.

It is appreciated application system resource switchover systems and methods can facilitate a variety of activities. Application service resource switchover systems and methods can be readily utilized with virtual machines. In one embodiment, virtual machines are considered or treated as services and are included in a start/stop order or sequence. This can facilitate implementation or orchestration of a multi-tier application spanning physical and virtual environments. The application system resource switchover systems and methods can also facilitate multi-tier application construct for start/stop orchestration, support for heterogeneous environments (OS, App, Cluster, concurrent execution on distributed nodes, utilization of Internal (derived)/External (specified) dependencies, visualization of consolidated resources/services, abstraction of objects and services for management, and unified DR/Migration service for business entities.

Figure 12:
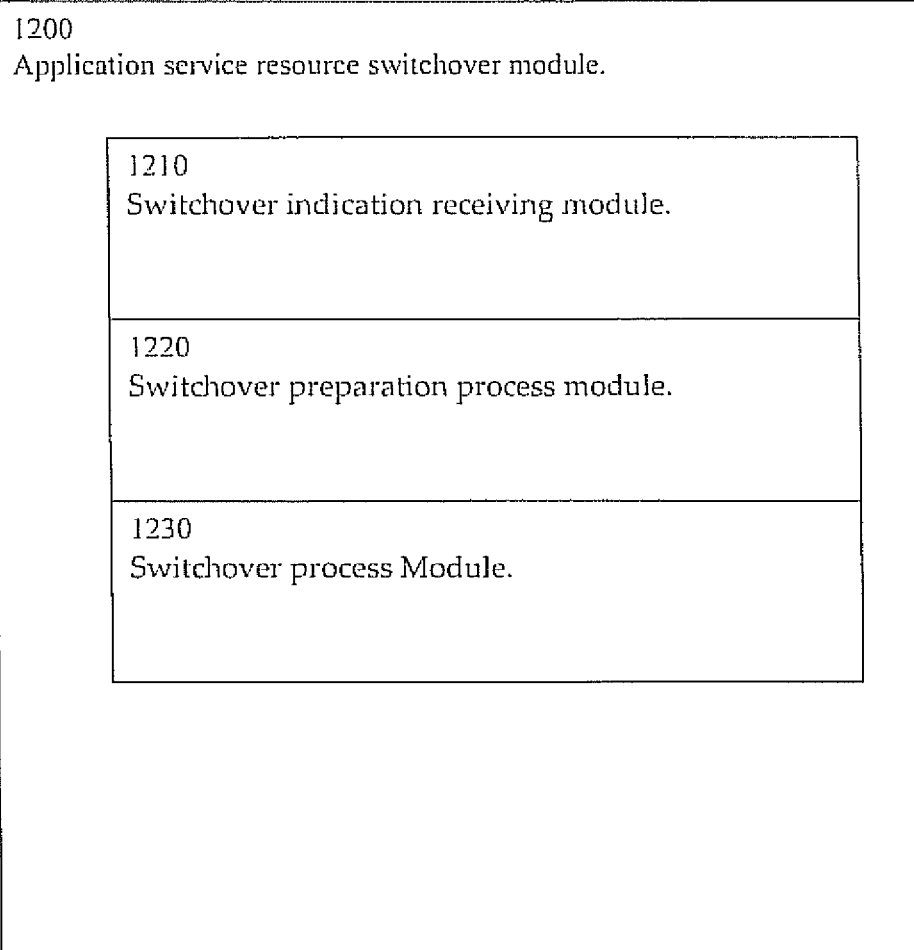
FIG. 12 is a block diagram of an exemplary application service resource switchover module in accordance with one embodiment of the present invention.

FIG. 12 is a block diagram of application service resource switchover module 1200 which includes instructions for directing a processor in the performance of an application service resource switchover method (e.g., application service resource switchover method 400, etc.) in accordance with one embodiment of the present invention. Application service resource switchover module 1200 includes switchover indication receiving module 1210, switchover preparation process module 1220 and switchover process module 1230. Switchover indication receiving module 1210 includes instructions for performing switchover indication receiving operations. In one embodiment, switchover indication receiving module 1210 includes instructions for switchover indication receiving operations as indicated in block 410. Switchover preparation process module 1220 includes instructions for performing switchover preparation process operations. In one embodiment, application switchover preparation process module 1220 includes instructions for switchover preparation process operations as indicated in block 420. Switchover process module 1230 includes instructions for performing switchover process operations. In one embodiment, switchover process module 1230 includes instructions for switchover process operations as indicated in block 430.

Figure 13:
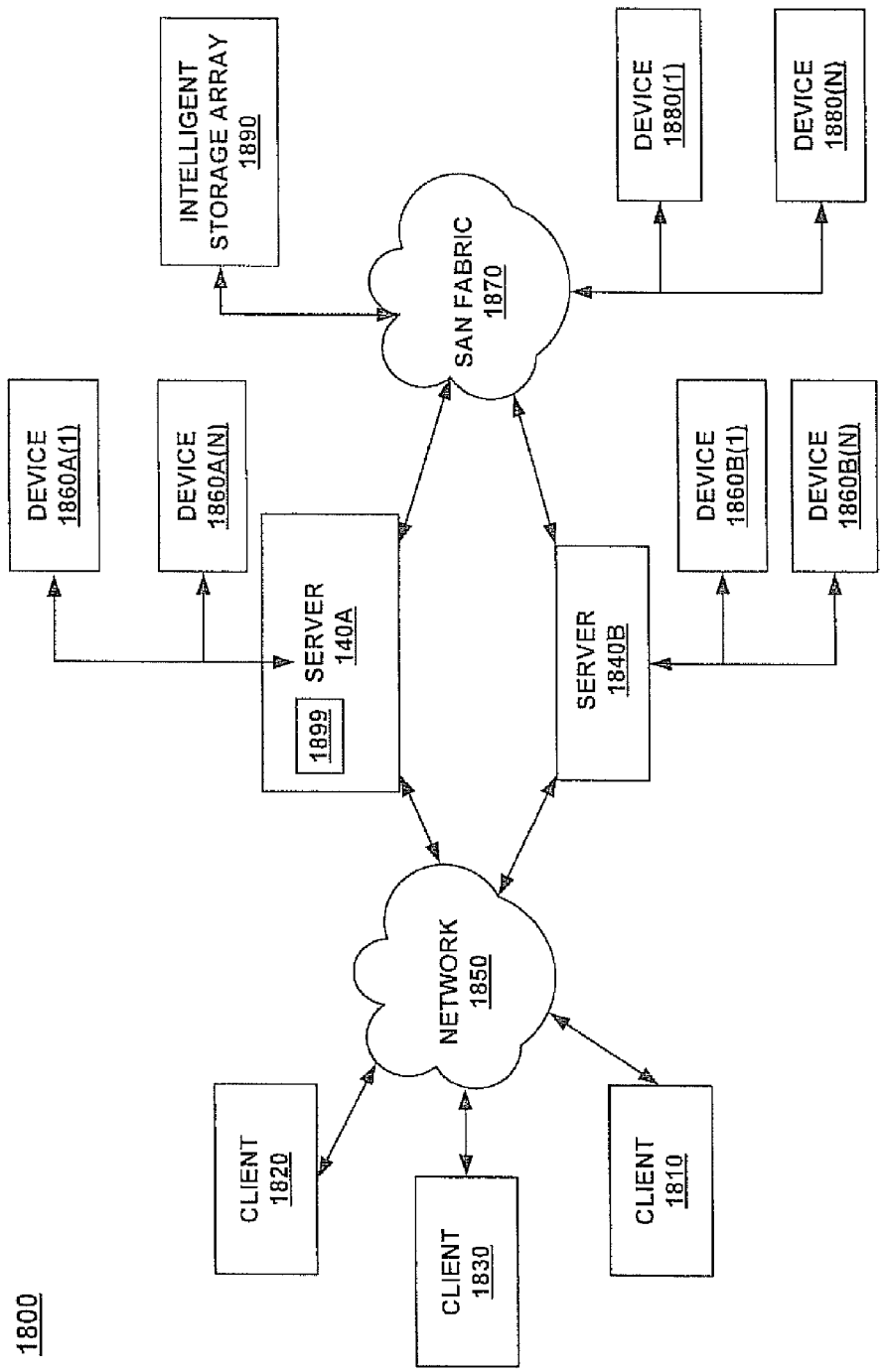
FIG. 13 is a block diagram depicting an exemplary network architecture in accordance with one embodiment of the present invention.

It is appreciated present application service resource switchover systems and methods can be implemented as part of a variety of environments. For example, application service resource switchover systems and methods can be implemented as part of a distributed computing environment, a cloud computing environment, a virtual environment, a client server environment, etc. In one embodiment, an application service resource switchover method (e.g., application service resource switchover method 400, etc.) can be implemented on a network. FIG. 13 is a block diagram depicting a network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes application service resource switchover module 1899. In one embodiment, an application service resource switchover module 1899 is similar to application service resource switchover module 1200. It is appreciated that present systems and methods are compatible with a variety of implementations. For example, portions of information and instructions associated with can be distributed in various resources.

Figure 14:
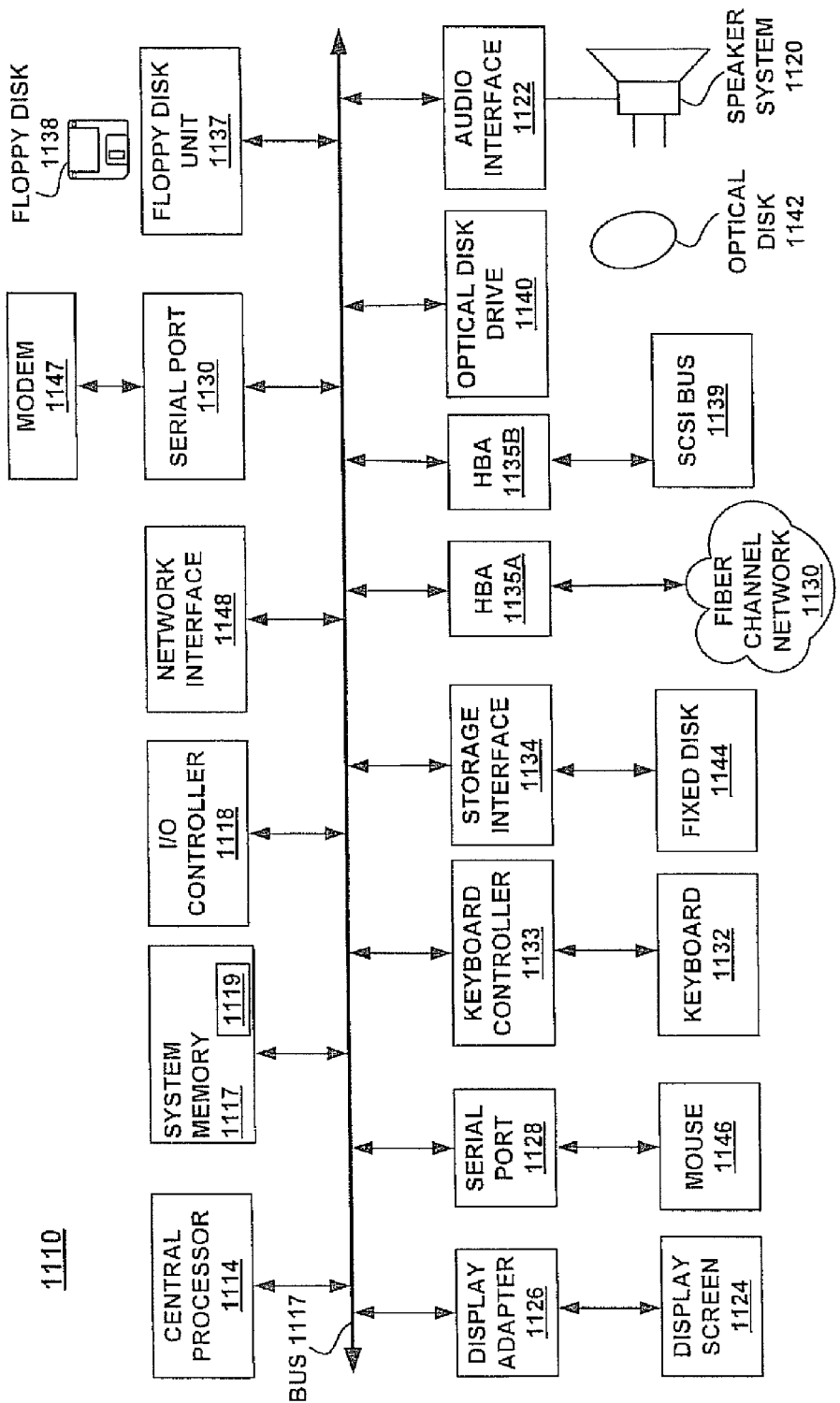
FIG. 14 depicts a block diagram of an exemplary computer system in accordance with one embodiment of the present invention.

FIG. 14 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1112 via serial port 1128), a modem 1147 (coupled to bus 1112 via serial port 1130), and a network interface 1148 (coupled directly to bus 1112).

Bus 1177 allows data communication between central processor 1114 and system memory 1117, which may include read-only memory (ROM) or flash memory (neither shown), and random access memory (RAM) (not shown), as previously noted. In one embodiment, instructions for performing an application dedicated registry hive method (e.g., similar to application dedicated registry hive method 300, etc.) are stored in one or more memories of computer system 1100 (e.g., in memory location 1119). The RAM is generally the main memory into which the operating system and application programs are loaded. In one embodiment, RAM 1117 includes an application service resource switchover module (e.g., in memory location 1119). In one embodiment, an application service resource switchover module stored in memory location 1119 is similar to application dedicated registry hive module 800. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 248.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present disclosure. The devices and subsystems can be interconnected in different ways from that shown in FIG. 12. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 12 depicts the use of a network such as the Internet for exchanging data, but the present disclosure is not limited to the Internet or any particular network-based environment.

Thus, the present systems and methods facilitate efficient and effective application service resource switchover. Unlike conventional attempts that included resource intensive operations, the present application service resource switchover approaches can be performed automatically with no or minimal user interaction.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. An application resource switchover method comprising:
   receiving a switchover indication, wherein the switchover indication includes an indication to switchover execution of at least one service of an application running on a primary system resource to running on a secondary system resource;
   performing a switchover preparation process in response to receiving the switchover indication, wherein the switchover preparation process includes automatically generating a switchover plan including indications of switchover operations for performance of a switchover process, wherein automatically generating the switchover plan includes utilizing a hierarchical order of application dependencies; and performing the switchover process in which the at least one service of the application is brought up on the secondary system resource in accordance with the switchover plan, wherein the switchover plan comprises a sequence for startup operations associated with the hierarchical order of application dependencies, wherein the application is a multi-tier application and the at least one service is managed by a first disaster recovery aware high availability solution, wherein the first disaster recovery aware high availability solution is different from a second disaster recovery aware high availability solution that manages a different service associated with the application.

2. The application resource switchover method of claim 1 wherein automatically generating the switchover plan includes analyzing the switchover indication, wherein analyzing the switchover indication includes determining a type of switchover corresponding to the switchover indication.

3. The application resource switchover method of claim 2 wherein the type of switchover is a migration switchover.

4. The application resource switchover method of claim 2 wherein the type of switchover is a recovery switchover.

5. The application resource switchover method of claim 1 wherein automatically generating the switchover plan includes:
determining a status of the at least one service of the application;
determining dependencies associated with the at least one service of the application; and
establishing the indications of switchover operations to implement a switchover in accordance with information on the status of the at least one service of the application and dependencies associated with the at least one service of the application.

6. The application resource switchover method of claim 1 wherein performing the switchover process includes:
bringing down the at least one service of the application on the primary system resource;
retrieving authority associated with running the at least one service of the application;
assigning the authority to the secondary system resource; and
bringing up the at least one service of the application on the secondary system resource.

7. A reprogrammable non-transitory computer readable storage medium having stored thereon, computer executable instructions that, when executed by a computer system cause the computer system to perform a method comprising:
receiving a switchover indication, wherein the switchover indication includes an indication to switchover execution of at least one service of an application running on a primary system resource to running on a secondary system resource;
performing a switchover preparation process in response to receiving the switchover indication, wherein the switchover preparation process includes automatically generating a switchover plan including indications of switchover operations for performance of a switchover process, wherein automatically generating the switchover plan includes utilizing a hierarchical order of application dependencies; and
performing the switchover process in which the at least one service of the application is brought up on the secondary system resource in accordance with the switchover plan, wherein the switchover plan comprises a sequence for startup operations associated with the hierarchical order of application dependencies, wherein the application is a multi-tier application and the at least one service is managed by a first disaster recovery aware high availability solution, wherein the first disaster recovery aware high availability solution is different from a second disaster recovery aware high availability solution that manages a different service associated with the application.

8. The reprogrammable non-transitory computer readable storage medium of claim 7 wherein automatically generating the switchover plan includes analyzing the switchover indication, wherein analyzing the switchover indication includes determining a type of switchover corresponding to the switchover indication.

9. The reprogrammable non-transitory computer readable storage medium of claim 8 wherein the type of switchover is a migration switchover.

10. The reprogrammable non-transitory computer readable storage medium of claim 8 wherein the type of switchover is a recovery switchover.

11. The reprogrammable non-transitory computer readable storage medium of claim 8 wherein automatically generating the switchover plan includes:
determining a status of the at least one service of the application;
determining dependencies associated with the at least one service of the application; and
establishing the indications of switchover operations to implement a switchover in accordance with information on the status of the at least one service of the application and dependencies associated with the at least one service of the application.

12. The reprogrammable non-transitory computer readable storage medium of claim 7 wherein performing the switchover process includes:
bringing down the at least one service of the application on the primary system resource;
retrieving authority associated with running the at least one service of the application;
assigning the authority to the secondary system resource; and
bringing up the at least one service of the application on the secondary system resource.

13. A computer system, comprising:
a processor coupled to a computer readable storage media and executing computer readable code which causes the computer system to perform operations including:
receiving a switchover indication, wherein the switchover indication includes an indication to switchover execution of at least one service of an application running on a primary system resource to running on a secondary system resource;
performing a switchover preparation process in response to receiving the switchover indication, wherein the switchover preparation process includes automatically generating a switchover plan including indications of switchover operations for performance of a switchover process, wherein automatically generating the switchover plan includes utilizing a hierarchical order of application dependencies; and
performing the switchover process in which the at least one service of the application is brought up on the secondary system resource in accordance with the switchover plan, wherein the switchover plan comprises a sequence for startup operations associated with the hierarchical order of application dependencies, wherein the application is a multi-tier application and the at least one service is managed by a first disaster recovery aware high availability solution, wherein the first disaster recovery aware high availability solution is different from a second disaster recovery aware high availability solution that manages a different service associated with the application.

14. The computer system of claim 13 wherein automatically generating the switchover plan includes analyzing the switchover indication, wherein analyzing the switchover indication includes determining a type of switchover corresponding to the switchover indication.

15. The computer system of claim 14 wherein the type of switchover is a migration switchover.

16. The computer system of claim 14 wherein the type of switchover is a recovery switchover.

17. The computer system of claim 13 wherein automatically generating the switchover plan includes:

determining a status of the at least one service of the application;

determining dependencies associated with the at least one service of the application; and establishing the indications of switchover operations to implement a switchover in accordance with information on the status of the at least one service of the application and dependencies associated with the at least one service of the application.

18. The computer system of claim 13 wherein performing the switchover process includes:

bringing down the at least one service of the application on the primary system resource;

retrieving authority associated with running the at least one service of the application;

assigning the authority to the secondary system resource; and bringing up the at least one service of the application on the secondary system resource.

* * * * *